UNITED STATES PATENT OFFICE.

WILLIAM S. RHEEM, OF OAKLAND, MARVIN L. CHAPPELL, OF BERKELEY, AND JOHN C. BLACK, OF STEGE, CALIFORNIA, ASSIGNORS TO STANDARD OIL COMPANY, OF RICHMOND, CALIFORNIA, A CORPORATION OF CALIFORNIA.

FIRE-EXTINGUISHING COMPOSITION.

984,853.  Specification of Letters Patent.  Patented Feb. 21, 1911.

No Drawing.  Application filed December 8, 1909. Serial No. 532,105.

*To all whom it may concern:*

Be it known that we, WILLIAM S. RHEEM, MARVIN L. CHAPPELL, and JOHN C. BLACK, all citizens of the United States, residing the said RHEEM at Oakland, in the county of Alameda and State of California, the said CHAPPELL at Berkeley, county of Alameda, State of California, and the said BLACK at Stege, county of Contra Costa, State of California, have invented certain new and useful Improvements in Fire-Extinguishing Compositions, of which the following is a specification.

Our invention relates to that class of fire-extinguishing compositions, especially adapted for oil-tank fires and other confined storage, in which two solutions when brought together upon or in the vicinity of the flaming surface will produce a non-combustible gas, and make a foam the bubbles of which will be expanded with the gas and rendered thereby non-combustible, the foam being caused to spread over the burning surface, to smother the flames. In compositions of this type there must be present certain bodies to lower the surface tension of the solution, thereby forming the foam. But while several substances will have this effect, all are, by no means, equally available, in practice. For example, as the solutions have to be stored an indefinite time, ready for use, and must be confined in vessels and delivered when used, through pipes, it will readily be seen that any substance of this nature which will precipitate while the solution is stored will be highly detrimental, both because it weakens the solution by removing a portion of itself, and because it clogs the pipes, a result to be avoided where in the nature of the case, every instant of time in applying the fire-extinguishing composition is of the utmost importance.

The object of our invention, therefore, is to provide a composition of this class, in which the nature of the foam producing substance is such that it will not precipitate, and the solutions can, therefore, be stored indefinitely, and be ready for instant use. We have found that glue is such a substance or body, and when added to either or both solutions, is not only an excellent medium for retaining the non-combustible gas and forming the foam, but also that a glue solution properly made and filtered will not precipitate; and due to this fact, it is possible to store the solution for an indefinite time, or until required for use. We have further found that by the addition of a small percentage of glucose to either or both solutions, a much more tenacious foam is produced. We have further found that by adding acetic acid to one of the solutions, the velocity of the reaction is increased, whereby the foam is generated more rapidly. These discoveries sufficiently indicate the nature of our improvements, and we shall now proceed to a full description of our invention.

There are two separate solutions. These, in their best and most complete form, are as follows:—Solution No. 1, consists of water, 100 parts; bicarbonate of soda 10 parts; glue 1 part; and glucose ¼ part. Solution No. 2, consists of water, 100 parts; aluminum sulfate 12 parts; acetic acid ½ part; glue 1 part; and glucose ¼ part. These proportions are given merely as a concrete example. We do not wish to be confined to them, as they may be varied; especially with regard to the proportions of glue and of glucose which may be varied through a wide range, and good results will follow; nor do we confine ourselves to putting the glue and glucose in both solutions, as they may be put in either solution, particularly in solution No. 2. But we prefer the solutions as we have given them, for a mixture of the two will produce a foam of sufficient fluidity to readily flow over the surface of the burning body to be extinguished. Nor do we confine ourselves to the use of glucose in either solution, but we advise it as an improvement on the use of glue alone, as producing a more tenacious foam. Nor, finally, do we confine ourselves to the use of acetic acid in the aluminum sulfate solution, but we advise it, for its effect in producing a more rapid generation of the foam, which is of distinct advantage, for the reason that if a burning oil tank were full of oil, there would be no chance of the mixed solutions getting into the oil before the foam is formed. The glue and glucose do not enter into the chemical reaction, but merely act as the foam forming substance, and it is, therefore, not essentially material in which solution they are placed, whether in one or both. The object and effect of the chemical reaction, as is apparent, is to produce $CO_2$ (carbon dioxid) which in turn forms the foam bubble from the glue and glucose, which being intimately mixed with the solution or solutions forms with the carbon dioxid very minute bubbles which will persist for many hours.

The application of this mixture to the flaming surface is, in general, the same as compositions of this type, namely the two solutions are run together upon the burning surface, so that a continuous supply of foam will be applied thereto. The foam bubble being expanded with carbon dioxid renders it non-combustible, and as it flows over the burning surface it will shut off the supply of oxygen, thereby extinguishing the fire.

If the presence of glue or glucose or both in the solutions should tend or be found to produce a fungus or mold in course of time while the solutions are stored, a small amount of a germicide should be placed in the solution containing these bodies. Any germicide will be proper to use, such as iron sulfate, arsenic, or copper sulfate, though in practice, we would use copper sulfate, in the proportion of about ¼ part.

Having thus described our invention, what we claim as new and desire to secure by Letters Patent is:—

1. A charge for fire extinguishers comprising glue, and separated solutions adapted on being brought together to produce a gas which is incombustible and a non-supporter of combustion, and to form a foam with the glue, said glue being an ingredient of at least one of said solutions.

2. A charge for fire extinguishers comprising separated solutions adapted on being brought together to produce a gas which is incombustible and a non-supporter of combustion, one of said solutions containing glue to form a foam the bubbles of which are expanded by said gas.

3. A charge for fire extinguishers comprising glue and glucose, and separated solutions adapted on being brought together to produce a gas which is incombustible and a non-supporter of combustion, and to form a foam with the glue and glucose, said glue and glucose being ingredients of at least one of said solutions.

4. A charge for fire extinguishers comprising separated solutions adapted on being brought together to produce a gas which is incombustible and a non-supporter of combustion, one of said solutions containing glue and glucose to form a foam the bubbles of which are expanded by said gas.

5. A charge for fire extinguishers comprising glue, and two separated solutions one containing water and bicarbonate of soda, and the other containing water, aluminum sulfate and acetic acid, said solutions being adapted on being brought together to produce carbon-dioxid to form a foam with the glue, said glue being an ingredient of at least one of said solutions.

6. A charge for fire extinguishers comprising glue and glucose, and two separated solutions one containing water and bicarbonate of soda and the other containing water, aluminum sulfate and acetic acid, said solutions being adapted on being brought together to produce carbon-dioxid to form a foam with the glue and glucose, said glue and glucose being ingredients of at least one of said solutions.

In testimony whereof we have signed our names to this specification in the presence of two subscribing witnesses.

WILLIAM S. RHEEM.
MARVIN L. CHAPPELL.
JOHN C. BLACK.

Witnesses:
A. K. DAGGETT,
WM. F. BOOTH.